(12) United States Patent
Hoefer

(10) Patent No.: US 6,460,268 B1
(45) Date of Patent: Oct. 8, 2002

(54) UNIVERSAL BEARING PRE-LOAD TOOL AND METHOD FOR USING THEREOF

(75) Inventor: Sean Karl Hoefer, Wabash, IN (US)

(73) Assignee: Spicer Technology Inc., Ft. Wayne, IN (US)

(*) Notice: Subject to any disclaimer, the term of this patent is extended or adjusted under 35 U.S.C. 154(b) by 9 days.

(21) Appl. No.: 09/822,467

(22) Filed: Apr. 2, 2001

(51) Int. Cl.$^7$ ................................................ G01B 5/14
(52) U.S. Cl. ............................ 33/645; 33/606; 33/783
(58) Field of Search ............................ 33/501.7, 533, 33/542, 600, 606, 613, 645, 655, 783, 787, 792, 795, 832, 833; 7/164; 81/3.7; 73/865.8, 865.9, 118.1

(56) References Cited

U.S. PATENT DOCUMENTS

| | | | |
|---|---|---|---|
| 1,531,289 A | * 3/1925 | Klingbeil | 81/3.7 |
| 2,656,607 A | * 10/1953 | Harding | 33/655 |
| 3,703,769 A | 11/1972 | Pfeiffer | 33/606 |
| 3,708,857 A | 1/1973 | Pfeiffer | 29/407.05 |
| 3,859,729 A | 1/1975 | Pfeiffer | 33/606 |
| 3,875,646 A | 4/1975 | Pfeiffer | 33/655 |
| 4,553,335 A | * 11/1985 | Woyton | 33/645 |
| 4,642,900 A | * 2/1987 | Provost et al. | 33/606 |
| 4,964,224 A | * 10/1990 | Jackson | 33/645 |
| 5,056,237 A | * 10/1991 | Saunders | 33/645 |
| 5,185,937 A | * 2/1993 | Piety et al. | 33/645 |
| 5,497,559 A | * 3/1996 | Okumura et al. | 33/600 |
| 6,219,927 B1 | * 4/2001 | Westermaier | 33/833 |

* cited by examiner

Primary Examiner—G. Bradley Bennett
(74) Attorney, Agent, or Firm—Liniak, Berenato, Longacre & White

(57) ABSTRACT

A universal differential bearing preload tool includes a pair of opposite cylindrical discs simulating differential bearing cups, a disc spreading device for adjusting a distance between the discs, and a force measuring device associated with the disc spreading device. The opposite cylindrical discs are removably fastened to the preload tool and selected from a plurality of discs having assorted external diameters simulating differential bearing cups of different sizes and manufactures. The bearing preload tool is used for mounting a differential case in a differential housing with a predetermined bearing preload.

13 Claims, 3 Drawing Sheets

UNIVERSAL BEARING PRE-LOAD TOOL AND METHOD FOR USING THEREOF

BACKGROUND OF THE INVENTION

1. Field of the Invention

The present invention relates to bearing preload tools, and more particularly to a bearing preload tool for differential assembly for motor vehicles, and a method for using thereof.

2. Description of the Prior Art

Differentials for automotive or similar uses are well known in the prior art, and generally comprise a differential case rotatably mounted in a differential housing or differential carrier by axially spaced differential bearing assemblies. The differential bearings are typically preloaded to provide the desired amount of backlash between a drive pinion and the ring gear of the drive gear assembly or to eliminate end play of the rotor have presented problems, particularly as the bearing assemblies or gears wear. Proper engagement of the ring gear carried by the differential case with the input drive pinion is necessary, and subsequent wear of the gears or bearings will result in misadjustment of backlash and possibly end play in the rotor. This in turn normally requires adjustment of the bearings. Generally, prior art differential case bearings have been made adjustable by use of adjustment shims or the like, with it many times being necessary to remove the differential case from the differential housing, select shims having appropriate thickness, then reassemble the differential case to affect adjustment of backlash or bearing preload. The selection of the shims is, currently, practically guesswork, and depends on a workmen's experience. Typically, it requires several disassembling-reassembling operations before the correct bearing preload is achieved. Such labor-intensive procedures add cost and complexity to the adjustment procedure.

Thus, there is a need for a tool that is simple and inexpensive that would allow reducing time for selecting shims of appropriate thickness for properly preloading differential bearings in accordance with manufacturer's specifications.

SUMMARY OF THE INVENTION

The present invention provides a novel universal differential bearing preload tool and a method for using thereof for mounting a differential case in a differential housing with a predetermined bearing preload, In one preferred embodiment, the universal differential bearing preload tool includes a pair of opposite cylindrical discs simulating differential bearing cups, a disc spreading device for adjusting a distance between the discs for simulating a bearing preload, and a force measuring device associated with said disc spreading device. The opposite cylindrical discs are removably fastened to the preload tool, and may be selected from a plurality of discs having assorted external diameters simulating differential bearing cups of different sizes and manufacturers.

The bearing preload tool is used in a method for mounting a differential case in a differential housing providing a predetermined bearing preload. The method comprises the steps of placing a bearing preload tool into the differential housing by spreading the discs until the discs are snug fit against a bearing bores, then measuring a first distance between certain base points on the differential housing in a non-preloaded condition. Next, the discs are spread outwardly until a desired preload force is achieved. A second distance between the base points in a preloaded condition that defines a desired spread is measured, and bearing preload tool is removed from the differential housing. Then, the bearing preload shim is selected based on a difference between the first and second distances, and a differential case along with the shim is mounted in the differential housing through differential support bearings.

Therefore, the present invention provides a novel universal bearing preload tool and method for mounting the differential assembly in the differential housing using the universal bearing preload tool with a predetermined bearing preload, which is simple, cost effective, and substantially reduces time and labor expenses.

BRIEF DESCRIPTION OF THE DRAWINGS

Other objects and advantages of the invention will become apparent from a study of the following specification when viewed in light of the accompanying drawings, wherein.

DETAILED DESCRIPTION OF PREFERRED EMBODIMENTS

The preferred embodiments of the present invention will now be described with the reference to accompanying drawings.

Figure 1:
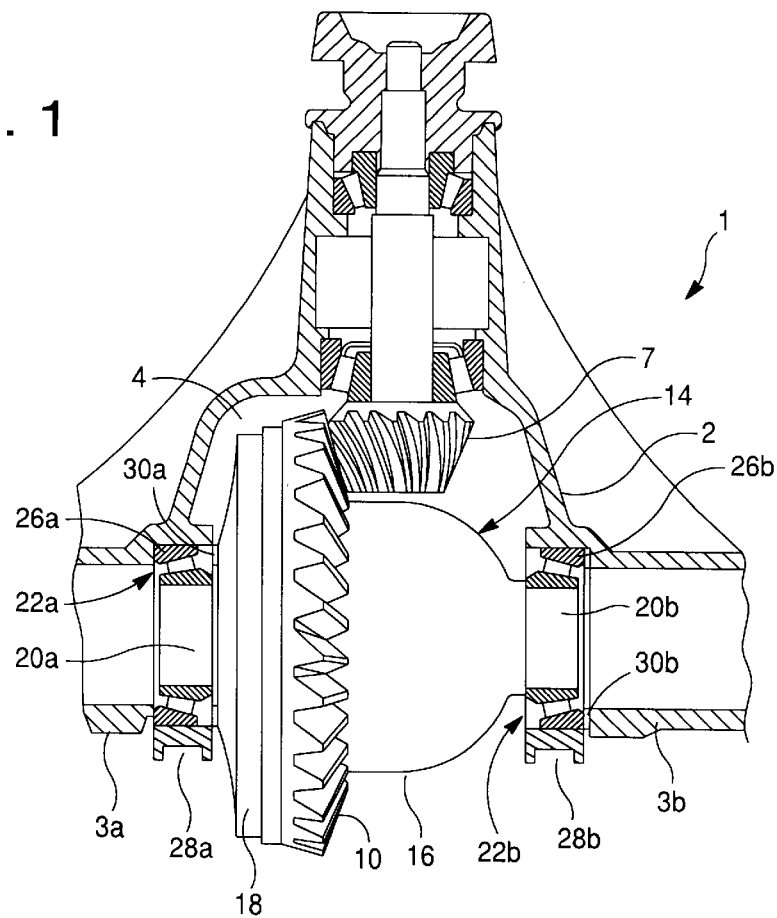
FIG. 1 is a fragmentary, partial sectional view of a differential assembly.

Referring now to the drawings, a vehicular axle assembly 1 is shown in FIG. 1, and includes a differential housing 2 carried on the underside of a vehicle (not shown). The differential housing 2 may include left and right axle tubes 3a and 3b respectively, projecting coaxially from opposite sides, or could be part of an independent suspension axle which would not require axle tubes 3a and 3b. The differential housing 2 defines a cavity 4 adapted for receiving a differential assembly 14 therewithin. The axle assembly 1 further includes a power input pinion gear 7 secured to a drive shaft. The pinion gear 7 meshes with a ring gear 10, which in turn is secured to a ring gear flange 18 associated with a differential case 16. The differential case 16 along with the ring gear 10 is rotatably mounted in the axle housing 2.

Figure 2:
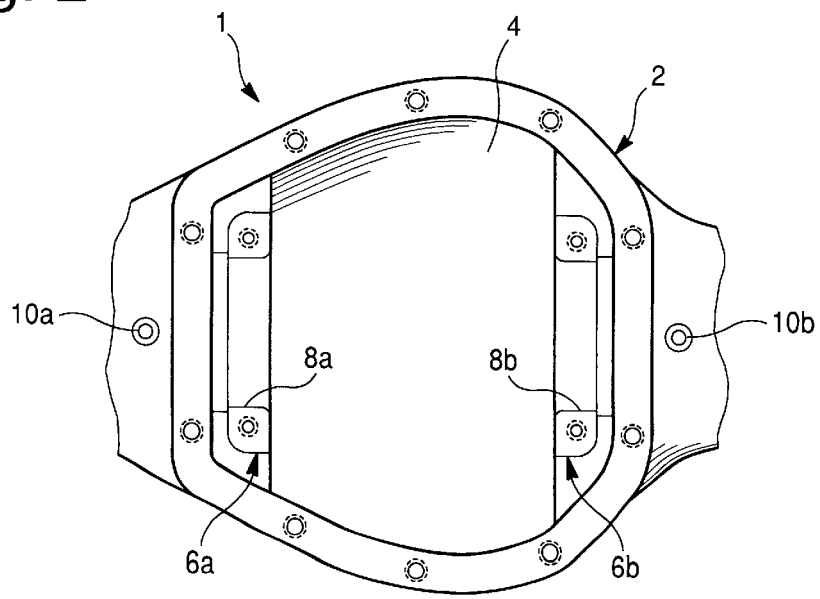
FIG. 2 is a partial view of a differential housing with removed cover plate.

As illustrated in FIG. 2, provided within the cavity 4 are two spaced apart bearing blocks 6a and 6b defining bearing bores 8a and 8b, respectively, when complementary bearing caps 28a and 28b, are fastened to the bearing blocks 6a and 6b.

Figure 3:
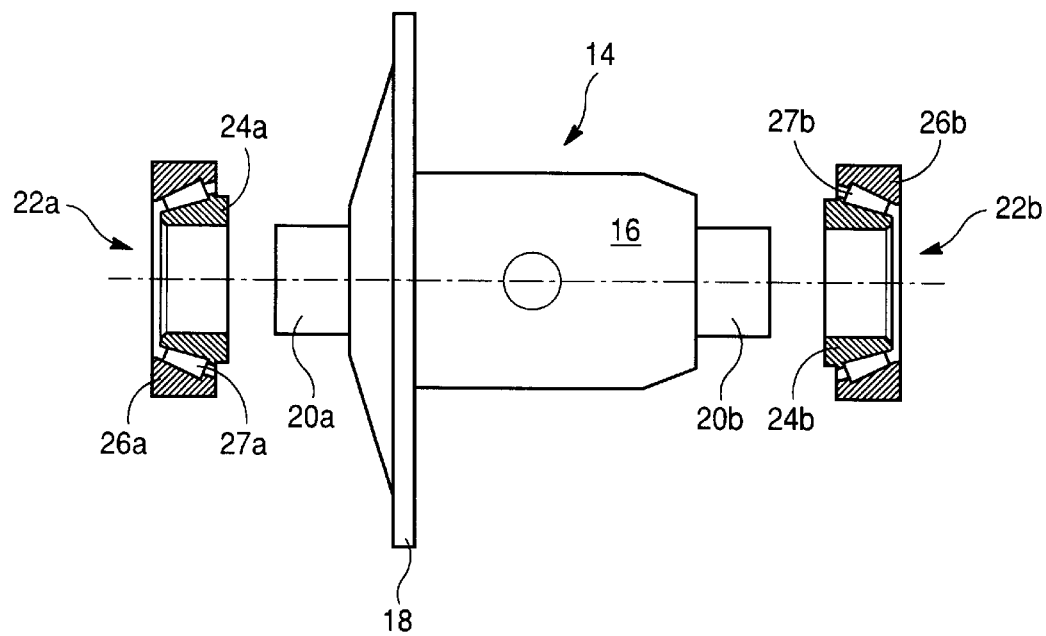
FIG. 3 is a view showing a differential case without a ring gear, with two bearing assemblies and without shims.
Figure 4:
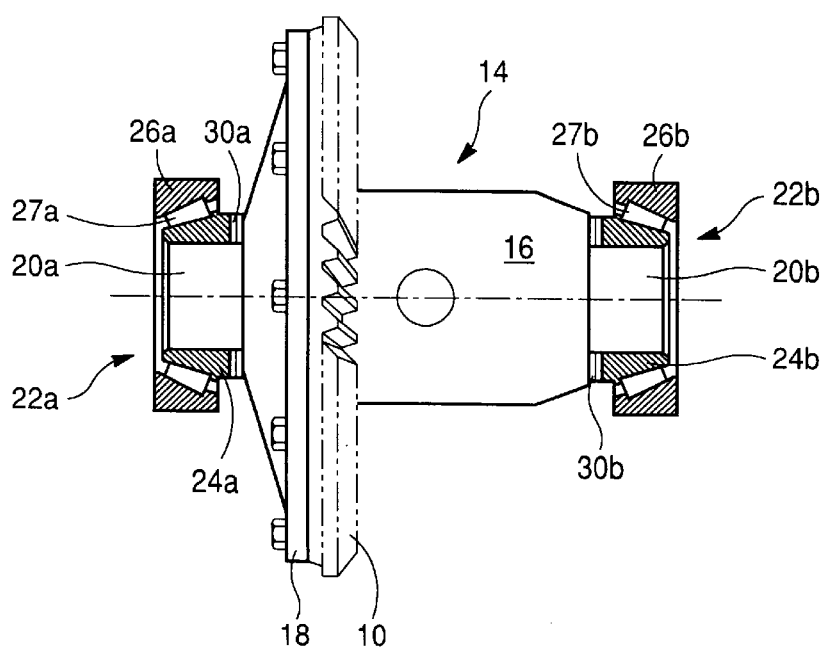
FIG. 4 is a view, partially in phantom and partially in cross-section, of a preloaded differential case assembly with bearings and inboard shims.

The differential assembly 14, illustrated in FIGS. 3 and 4, is a conventional differential assembly well known in the art. The differential assembly 14 includes the differential case 16 having the flange 18, and two opposite cylindrical bearing hubs 20a and 20b at each lateral end thereof. The ring gear 10 is fastened to the flange 18, typically by a plurality of bolts (not shown).

The differential case 16 is rotatably supported in the bearing bores 8a and 8b, by means of anti-friction bearings. Preferably, the anti-friction bearings are tapered roller bearings 22a and 22b that are pre-assembled units including associated bearing caps 26a and 26b. The bearing caps 26a, 26b are secured to bearing blocks 6a and 6b formed in the differential housing 2.

The bearing 22a is disposed between the bearing bore 8a and the bearing hub 20a. Correspondingly, the bearing 22b is disposed between the bearing bore 8b, and the bearing hub 20b. Each of the bearings 22a and 22b includes an inner race (24a and 24b) mounted to the associated bearing hub (20a or 20b), the bearing cup (26a and 26b) and a plurality of tapered rolling elements (27a and 27b) disposed therebetween.

For preloading of the bearings 22a and 22b, adjustment shims are conventionally used. The exemplary embodiment of the axle assembly illustrated in FIG. 1, shows an inboard shim 30a and an outboard shim 30b. It will be appreciated that FIG. 1 is merely a schematic illustration to show that differential assemblies may have inboard shims, as well as outboard shims, and the differential assembly 14 will have either inboard shims or outboard shims, but will not have the combination of the inboard and outboard shims, as illustrated in FIG. 1.

Figure 5:
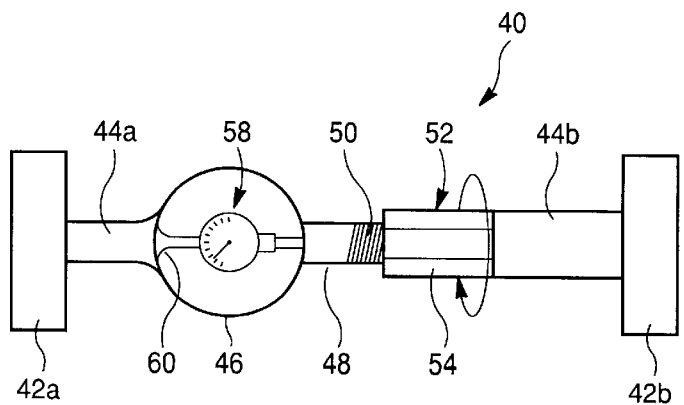
FIG. 5 is an elevational view of a universal bearing preload tool in accordance with the preferred embodiment of the present invention.
Figure 6:
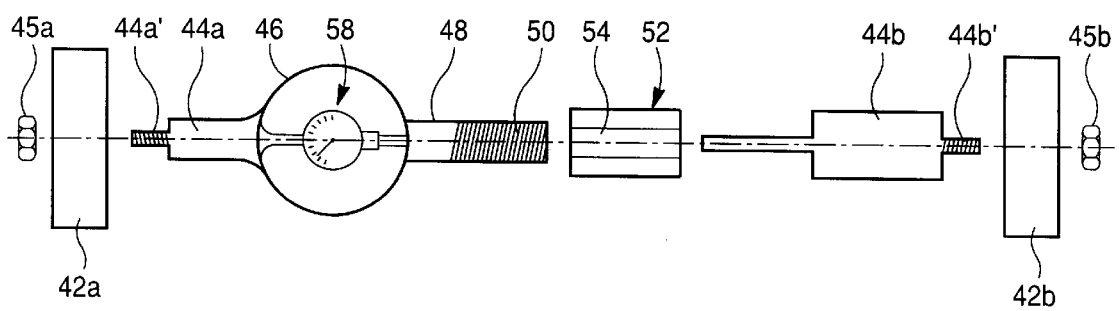
FIG. 6 shows parts of the universal bearing preload tool in accordance with the preferred embodiment of the present invention.

First aspect of the present invention is described with the reference to FIGS. 5 and 6 wherein there is disclosed a bearing preload tool 40 in accordance with the preferred embodiment of the present invention. The bearing preload tool 40 comprises a pair of opposite cylindrical discs 42a and 42b simulating bearing cups 26a and 26b. Secured to each of the discs 42a and 42b are rigid rods 44a and 44b. A spring device in the form of a resilient annular band 46 is disposed between the discs 42a and 42b. The disc 42a is operatively connected to the resilient annular band 46 by means of a rod 44a. It would be appreciated that the rod 44a is attached to the disc 42a and the annular band 46 by any appropriate means well known in the art, such as welding, threaded connection, etc. In accordance with the preferred embodiment of the present invention, illustrated in FIG. 5, the disc 42a is removably fastened to the rod 44a by means of the threaded connection. As illustrated in FIG. 5, the rod 44a has a threaded end 44a' fastened to the disc 42a by means of a nut 45a. Alternatively, the disc 42a may have a threaded bore (not shown) complimentary to the threaded end 44a' of the rod 44a. The rod 44a is preferably welded to the annular band 46. Alternatively, the 44a may be removably connected to the annular band 46.

The disc 42b is operatively connected to the resilient annular band 46 by means of a rod 44b, a threaded stud 48 and a nut member 52 interposed therebetween.

In accordance with the preferred embodiment of the present invention, illustrated in FIG. 5, the disc 42b is removably fastened to the rod 44b by means of the threaded connection. As illustrated in FIG. 5, the rod 44b has a threaded end 44b' fastened to the disc 42b by means of a bolt 45b. Alternatively, the disc 42b may have a threaded bore (not shown) complimentary to the threaded end 44b' of the rod 44b. A stud 48 is fixed to the annular band 46, opposite to the rod 44a, at one end thereof, preferably by welding. Alternatively, the stud 48 may be removably fastened to the annular band 46. The other end of the stud 48 is provided with threads 50 engaging internal threads of one end the nut member 52. The other end of the nut member 50 is connected to the rod 44b by any appropriate means known in the prior art, that allows relative rotation between the nut member 52 and the rod 44b. The nut member 52 is provided with a wrench-engaging surface 54 having polygonal cross-section, typically hexagonal. Combination of the rod 44b, the threaded stud 48 and the nut member 52 defines a disc-spreading device 56 that allows for adjustment a distance between the discs 42a and 42b by rotating the nut member 52.

Moreover, a measuring gauge 58 is positioned within the band 46 by means of mounting brackets 60 of any appropriate construction. Preferably, the measuring gauge 58 is a force measuring gauge. However, a dial indicator for measuring a deflection of the annular band 46, may be used if the technician knows a value of the deflection of the annular band 46 corresponding to a desired bearing preload.

Thus, the present invention discloses a novel arrangement of the bearing preload tool 40. As noted hereinabove, in accordance with the preferred embodiment of the present invention, the bearing simulating discs 42a and 42b are removably fastened to the bearing preload tool 40, that allows using the discs 42a and 42b from a set of a plurality of discs having assorted external diameters simulating differential bearing cups of different sizes and manufacturers. This provision makes the bearing preload tool 40 universal so that it can be used for virtually all axle designs.

The second aspect of the present invention is a method for mounting the differential case 16 in the differential housing 2 that provides a predetermined bearing preload. The method employs the bearing preload tool 40 described in detail hereinabove.

First, the bearing preload tool 40 is placed into the differential housing 2 by mounting the discs 42a and 42b into the bearing bores 8a and 8b, correspondingly. Using any appropriate conventional wrench (not shown) engaging the wrench-engaging surface 54, torque is applied to the nut member 52 for spreading the discs 42a and 42b until they snug against the bearing bores 8a and 8b. Then the bearing caps 28a and 28b are bolted to the bearing blocks 6a and 6b and tightened to their torque specifications. Next, a distance $S_0$ between two opposite base points each associated with the corresponding bearing block 6a or 6b, is measured using a conventional spread gauge (not shown). Preferably, spreader holes 10a and 10b on the differential housing 2, shown in FIG. 2, are used as the base points. Alternatively, any appropriate opposite points on the bearing blocks 6a and 6b or the bearing caps 28a and 28b may be used as the base points.

After that, the wrench torque is again applied to the nut member 52 of the disc-spreading device 56 until the force measuring gauge 58 positioned within the band 46, shows a predetermined desired bearing pre-load force $F_{PL}$ known to a technician through a chart. In this position, the bearing preload tool 40 simulates the differential assembly 14 with properly pre-loaded bearings 22a and 22b. The spread gauge is then placed back on the differential housing 2 to measure a distance $S_{PL}$ between the spreader holes 10a and 10b in order to determine the spread between the base points when the bearings are properly pre-loaded. The difference between $S_O$ and $S_{PL}$ allows estimating the shim thickness that would provide a desired bearing pre-load. Then, the bearing preload tool 40 is removed from the differential housing 2, and the differential case 16, the bearings 22a and 22b, and the shims 30a and 30b of estimated thickness are mounted to the differential housing 2. Placing the spread gauge on the differential housing 2, distance $S_d$ between the spreader holes is again measured in order to determine an actual spread between the base points when the differential assembly 14 is mounted to the differential housing 2. If the shims of the appropriate thickness are selected, then the distance $S_d$ is substantially equals to the distance $S_{PL}$. However, if the bearings 22a and 22b are not properly pre-loaded, then the distance $S_d$ differs from the distance $S_{PL}$. In this case, the differential assembly 14 is removed from the differential housing 2, the shim thickness is appropriately adjusted, the differential assembly 14 is mounted back to the differential housing 2, and distance $S_d$ between the spreader holes 10a and 10b is again measured. The last couple of steps are repeated until the distance $S_d$ is substantially equal to the distance $S_{PL}$ that indicates that the bearings 22a and 22b are properly pre-loaded.

Therefore, the present invention provides a novel universal bearing preload tool and method for mounting the differential assembly in the differential housing using the universal bearing preload tool with a predetermined bearing preload, which is simple, cost effective, and substantially reduces time and labor expenses.

The foregoing description of the preferred embodiments of the present invention has been presented for the purpose of illustration in accordance with the provisions of the Patent Statutes. It is not intended to be exhaustive or to limit the invention to the precise forms disclosed. The embodiments disclosed hereinabove were chosen in order to best illustrate the principles of the present invention and its practical application to thereby enable those of ordinary skill in the art to best utilize the invention in various embodiments and with various modifications as are suited to the particular use contemplated, as long as the principles described herein are followed. This application is therefore intended to cover any variations, uses, or adaptations of the invention using its general principles. Further, this application as intended to cover such departures from the present disclosure as come within known or customary practice in the art to which this invention pertains. Thus, changes can be made in the above-described invention without departing from the intent and scope thereof. It is also intended that the scope of the present invention be defined by the claims appended thereto.

What is claimed is:

1. A bearing preload tool comprising:
    a pair of opposite cylindrical discs simulating differential bearing cups;
    a disc spreading device for adjusting a distance between said discs for simulating a bearing preload; and
    a measuring device associated with said disc spreading device for determining a force acting on said discs.

2. The bearing preload tool as defined in claim 1, wherein said disc spreading device includes a pair of opposite rods each secured to one of said discs.

3. The bearing preload tool as defined in claim 2, wherein said discs are removably attached to said rods.

4. The bearing preload tool as defined in claim 1, wherein said pair said discs is selected from a plurality of pairs of discs having assorted size providing simulation of dimensionally different bearing cups.

5. The bearing preload tool as defined in claim 1, further including a spring device disposed between said discs.

6. The bearing preload tool as defined in claim 5, wherein said spring device is in the form of a resilient annular band.

7. The bearing preload tool as defined in claim 6, wherein said measuring device is disposed within said resilient annular band.

8. The bearing preload tool as defined in claim 1, wherein said measuring device is a force measuring device.

9. The bearing preload tool as defined in claim 1, wherein said disc spreading device includes a threaded stud and a nut member threadedly connected to said stud so that rotational movement of said nut member adjusts the distance between said discs.

10. A method for mounting a differential case in a differential housing providing a predetermined bearing preload, said method comprising the steps of:
    providing a differential housing having opposite bearing blocks forming bearing bores adapted for receiving differential support bearings, said differential housing having a pair of base points each associated with one of said bearing bores;
    placing a bearing preload tool in accordance with claim 1 into said differential housing by spreading the discs until the discs are snug fit against said bearing bores;
    installing bearing caps;
    measuring a first distance between said base points in a non-preloaded condition;
    spreading the discs of said preload tool further outwardly until a desired preload force is achieved;
    measuring a second distance between said base points in a preloaded condition that defines a desired spread;
    removing the bearing preload tool from said differential housing;
    selecting at least one bearing preload shim having a thickness estimated based on a difference between said first distance and said second distance;
    mounting a differential case along with said at least one shim in said differential housing through differential support bearings.

11. The method for mounting a differential case in a differential housing as defined in claim 10, further comprising the steps of:
    measuring a third distance between said base points when said differential case is assembled in said differential housing and preloaded with said at least one shim;
    comparing said third distance with said desired spread;
    adjusting the thickness of said bearing preload shim if said third distance substantially differs from said desired spread until said third distance is substantially equals to said desired spread.

12. The method for mounting a differential case in a differential housing as defined in claim 10, wherein said desired preload force is measured by a measuring device of said bearing preload tool.

13. The method for mounting a differential case in a differential housing as defined in claim 10, wherein a spread gauge is used to measure said distance between said base points.

* * * * *